(12) United States Patent
Okamoto et al.

(10) Patent No.: US 8,346,460 B2
(45) Date of Patent: Jan. 1, 2013

(54) ACTIVE VIBRATION ISOLATING SUPPORT APPARATUS AND METHOD FOR CONTROLLING THE SAME

(75) Inventors: Hideyuki Okamoto, Saitama (JP); Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 494 days.

(21) Appl. No.: 12/729,767

(22) Filed: Mar. 23, 2010

(65) Prior Publication Data
US 2010/0250104 A1    Sep. 30, 2010

(30) Foreign Application Priority Data

Mar. 24, 2009 (JP) ................................ 2009-071883
Mar. 24, 2009 (JP) ................................ 2009-071921

(51) Int. Cl.
*F02D 45/00* (2006.01)
(52) U.S. Cl. .................. 701/111; 123/192.2; 267/140.12
(58) Field of Classification Search .................. 701/102, 701/110, 111, 114; 123/436, 481, 192.1, 123/192.2, 185.13, 185.1; 267/140.13–140.15
See application file for complete search history.

(56) References Cited

U.S. PATENT DOCUMENTS

| 4,928,652 | A | * | 5/1990 | Shinya et al. ................ 477/111 |
| 5,906,651 | A | * | 5/1999 | Amano ........................ 701/110 |
| 2007/0013116 | A1 | | 1/2007 | Nemoto et al. |
| 2007/0079786 | A1 | * | 4/2007 | Osman ...................... 123/192.2 |
| 2009/0039577 | A1 | | 2/2009 | Ishiguro et al. |
| 2009/0118990 | A1 | * | 5/2009 | Suzuki ......................... 701/111 |
| 2009/0224446 | A1 | * | 9/2009 | Ishiguro et al. .......... 267/140.14 |
| 2010/0246086 | A1 | * | 9/2010 | Ishiguro et al. .......... 267/140.13 |

FOREIGN PATENT DOCUMENTS

EP 2 023 008 A1 2/2009
JP 2005-003050 A 1/2005

* cited by examiner

*Primary Examiner* — John Kwon
*Assistant Examiner* — Johnny Hoang
(74) *Attorney, Agent, or Firm* — Carrier Blackman & Associates, P.C.; Joseph P. Carrier; William D. Blackman

(57) ABSTRACT

When a revolution speed of the engine (crankshaft) changes faster or slower, the vibration from the engine is propagated to an occupant in the vehicle, and the occupant may feel a sense of discomfort. For this reason, the present invention provides an active vibration isolating support apparatus and method for controlling the same to suppress the propagation of the vibration from the engine to the vehicle body so that the occupant may feel less sense of discomfort even if the revolution speed of the engine changes.

6 Claims, 8 Drawing Sheets

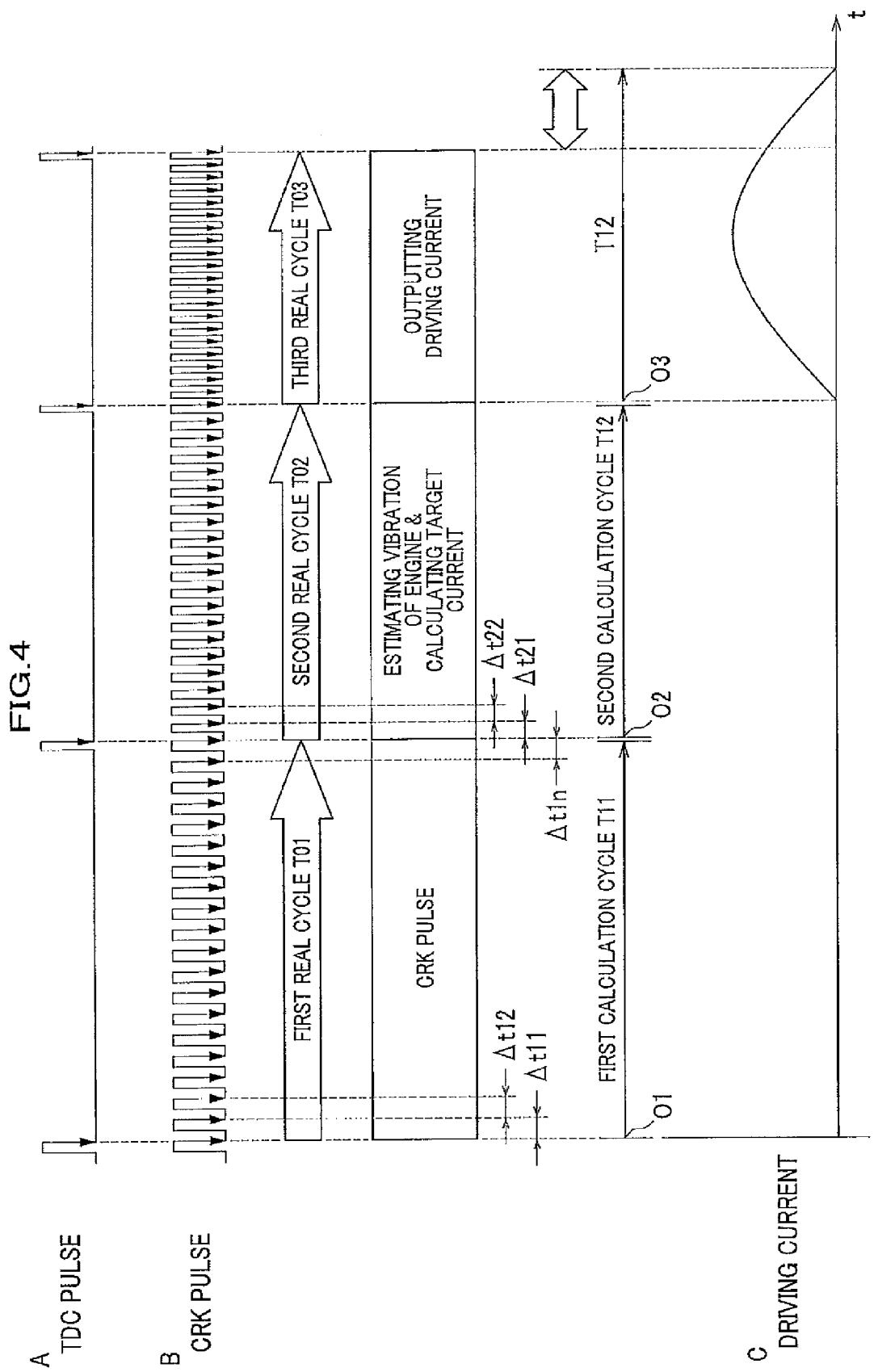

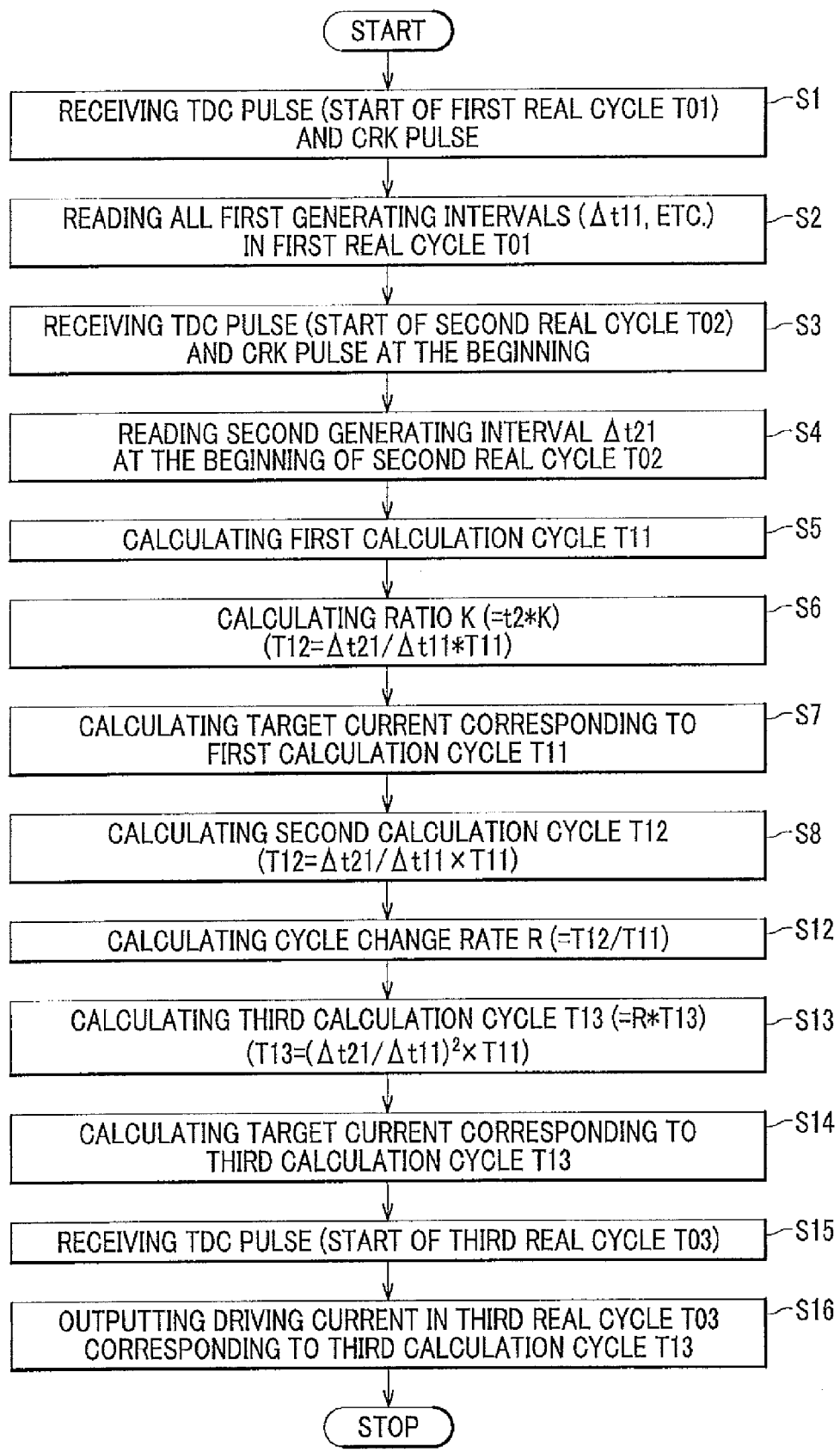

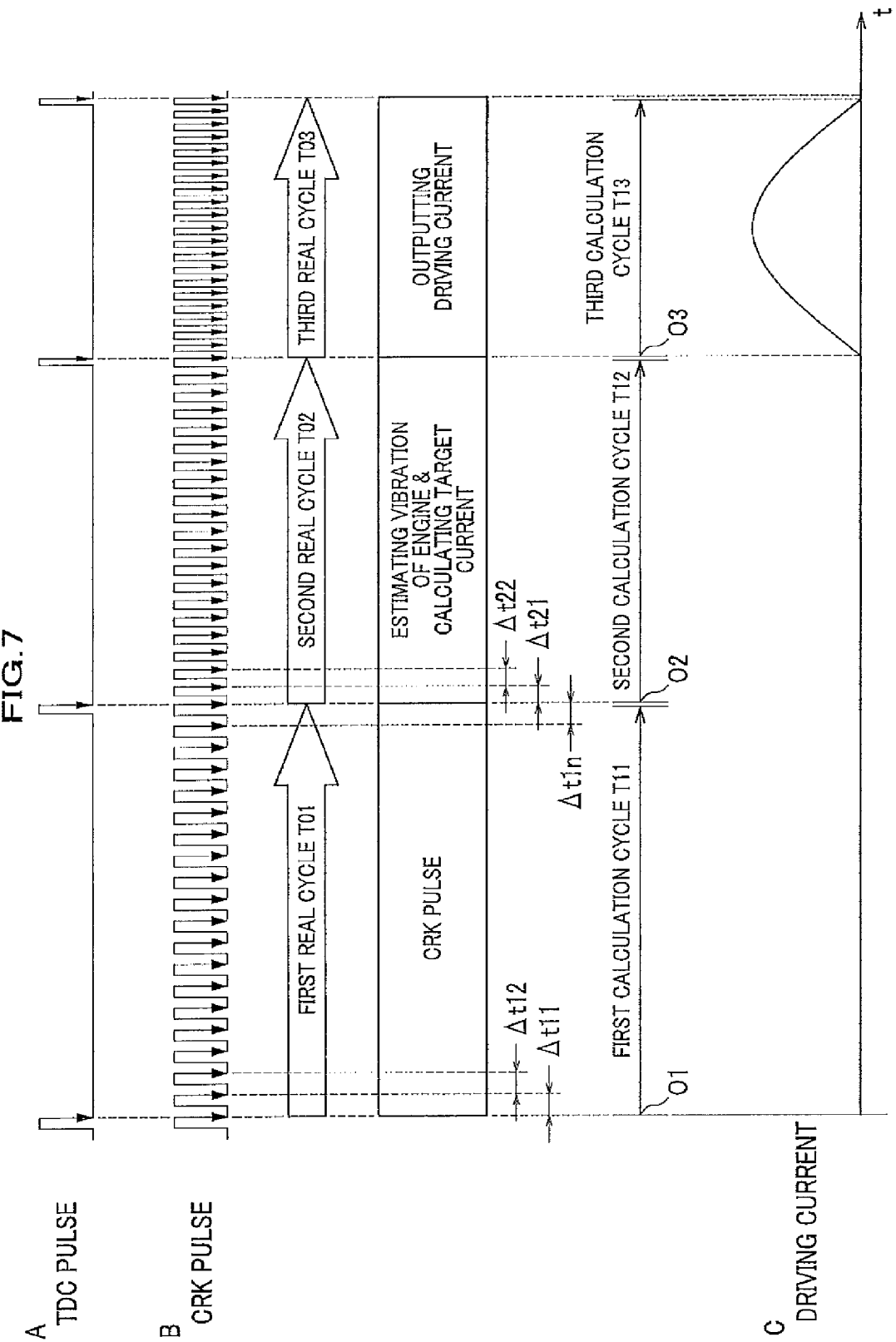

FIG.8
FIG.8A
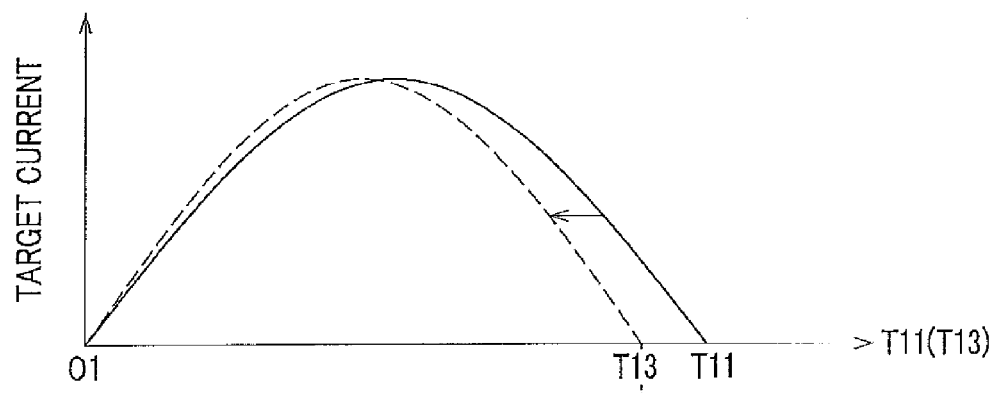
FIG.8B
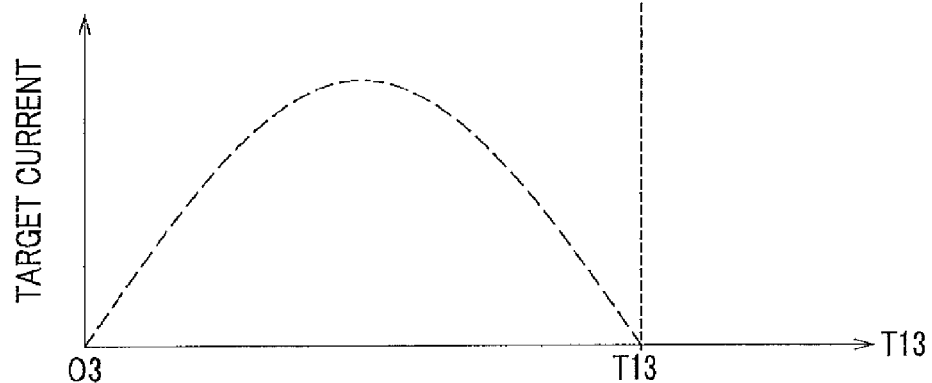
FIG.8C
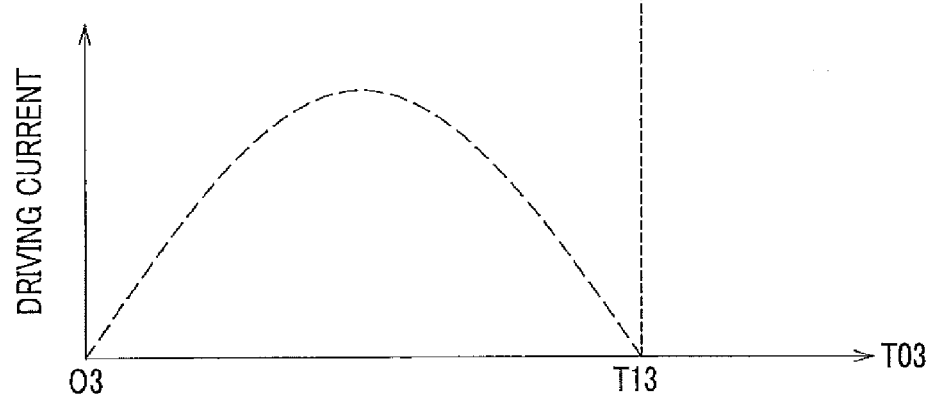

ACTIVE VIBRATION ISOLATING SUPPORT APPARATUS AND METHOD FOR CONTROLLING THE SAME

CROSS REFERENCE TO RELATED APPLICATION

The present application claims benefit of the filing dates of Japanese Patent Applications Nos. 2009-071883 filed on Mar. 24, 2009, and 2009-071921 filed on Mar. 24, 2009 which are incorporated herein by reference.

BACKGROUND OF THE INVENTION

1. Field of the Invention

The present invention relates to an active vibration isolating support apparatus to elastically support an engine in a vehicle body so as to suppress propagation of vibration from the engine to the vehicle body, and a method for controlling the same.

2. Description of the Related Art

Because the vibration in the engine is generated per revolution of a crankshaft, the vibration is generated at a relatively high frequency, single vibration terminates in short time, and a cycle of the vibration is short. For this reason, it has been proposed that a control to suppress the propagation of the vibration is performed using a time during which three vibrations are generated (for example, see JP 2005-003050 A). If times during which three vibrations are generated are denoted as a first real cycle, a second real cycle, and a third real cycle in sequence, the vibration is measured in the first real cycle, a target current of a driving current supplied to the active vibration isolating support apparatus is calculated in the second real cycle, and the driving current is supplied to the active vibration isolating support apparatus in the third real cycle.

However, when a revolution speed of the engine (crankshaft) changes faster or slower, the vibration from the engine is propagated to an occupant in the vehicle, and the occupant may feel a sense of discomfort.

For this reason, an object of the present invention is to provide an active vibration isolating support apparatus and method for controlling the same to suppress the propagation of the vibration from the engine to the vehicle body so that the occupant may feel less sense of discomfort even if the revolution speed of the engine changes.

SUMMARY OF THE INVENTION

The present invention provides an active vibration isolating support apparatus, including: a control unit to measure a crank pulse based on revolution of an engine, to calculate a target current value supplied to an actuator for isolating vibration in a next second vibration cycle using data of the crank pulse which belongs to a first vibration cycle of a cycle of vibration of the engine, and to control the actuator using the calculated target current value in a next third vibration cycle, in which the control unit calculates a length of the first vibration cycle, defines a crank pulse interval of the crank pulse which belong to the first vibration cycle at a predetermined position of the first vibration cycle as a first pulse interval, defines a crank pulse interval of the crank pulse which belong to the second vibration cycle at a predetermined position of the second vibration cycle which is set corresponding to the predetermined position of the first vibration cycle as a second pulse interval, calculates a length of the second vibration cycle using the first pulse interval, the second pulse interval, and the length of the first vibration cycle, calculates a length of the third vibration cycle using the length of the first vibration cycle, and the length of the second vibration cycle, and calculates the target current value supplied to the actuator using the calculated length of the third vibration cycle in the second vibration cycle.

When the revolution speed of the engine changes (for example, changes faster), the cycle of the vibration generated in the engine becomes shorter in the order of the first vibration cycle (the first real cycle), the next second vibration cycle (the second real cycle), and the next third vibration cycle (the third real cycle). In the case where the vibration is measured by reading a first generating interval (the first pulse interval) of the crank pulse over the first real cycle in the first real cycle, where the target current of the driving current supplied to the active vibration isolating support apparatus is calculated in the second real cycle so as to correspond to the first real cycle, and where the driving current is supplied to the active vibration isolating support apparatus in the third real cycle so as to realize the target current corresponding to the first real cycle, it is thought that suppression of the propagation of the vibration is not enough because the driving current for the first real cycle whose length differs from that of the third real cycle is supplied in the third real cycle.

In the present invention, a pulse based on the revolution of the engine is measured, first to third vibration cycles are set, and the driving current of the actuator in the third vibration cycle is calculated from the lengths of the first and second vibration cycles and pulse data. For this reason, it possible to supply the driving current which is more appropriate to the third vibration cycle, and to suppress the propagation of the vibration of the engine enough.

Also, in the present invention, the length of the third vibration cycle can be surely calculated in the second vibration cycle. Although the first generating interval (the first pulse interval) at a predetermined position which is a beginning, etc., of the first vibration cycle (the first real cycle), the second generating interval (the second pulse interval) at a predetermined position which is a beginning, etc., of the second vibration cycle (the second real cycle), and the length of the first vibration cycle (the first real cycle) are used for calculation of the length of the third vibration cycle, the first generating interval and the first calculation cycle at the predetermined position (beginning, etc.) of the first real cycle are obtained based on the data read at the first real cycle, and the second generating interval at the predetermined position (beginning, etc.) of the second real cycle is obtained at the predetermined position (beginning, etc.) of the second real cycle. For this reason, because third calculation cycle can be calculated based on the data obtained by the predetermined position (beginning, etc.) of the second real cycle at the latest, the length of the third vibration cycle (the third calculation cycle) can be surely calculated in the second real cycle. Conversely, back-calculating a time necessary for calculating the length of the third vibration cycle (the third calculation cycle), etc., the predetermined position may be set not only at the beginning but also at a middle and an end of the second real cycle as long as the length of the third vibration cycle (the third calculation cycle), etc. can be calculated in the second real cycle, and a predetermined position set for the first real cycle is set at the beginning, middle, or end corresponding to the above.

Also, the present invention provides an active vibration isolating support apparatus, including: a control unit to measure a crank pulse based on revolution of an engine, to calculate a target current value supplied to an actuator for isolating vibration in a next second vibration cycle using data of the crank pulse which belongs to a first vibration cycle of a cycle of vibration of the engine, and to control the actuator using the calculated target current value in a next third vibration cycle, in which the control unit calculates a length of the first vibration cycle, defines a crank pulse interval of the crank pulse which belong to the first vibration cycle at a predetermined position of the first vibration cycle as a first pulse interval, defines a crank pulse interval of the crank pulse which belong to the second vibration cycle at a predetermined position of the second vibration cycle which is set corresponding to the predetermined position of the first vibration cycle as a second pulse interval, calculates a length of the second vibration cycle using the first pulse interval, the second pulse interval, and the length of the first vibration cycle, and calculates the target current value supplied to the actuator using the calculated length of the second vibration cycle in the second vibration cycle.

When the revolution speed of the engine changes (for example, changes faster), the cycle of the vibration generated in the engine becomes shorter in the order of the first vibration cycle (the first real cycle), the next second vibration cycle (the second real cycle), and the next third vibration cycle (the third real cycle). In the case where the vibration is measured by reading a first generating interval (the first pulse interval) of the crank pulse over the first real cycle in the first real cycle, where the target current of the driving current supplied to the active vibration isolating support apparatus is calculated in the second real cycle so as to correspond to the first real cycle, and where the driving current is supplied to the active vibration isolating support apparatus in the third real cycle so as to realize the target current corresponding to the first real cycle, it is thought that suppression of the propagation of the vibration is not enough because the driving current for the first real cycle whose length differs from that of the third real cycle is supplied in the third real cycle.

In the present invention, the length of the second vibration cycle is calculated, and the target current is normalized by the length of the second vibration cycle. Because a driving current for the second real cycle (the second calculation cycle) whose value is not separate from that for the first real cycle is supplied for the third real cycle, deviation in cycle becomes small, and the propagation of the vibration of the engine can be suppressed enough.

Also, in the present invention, the length of the second vibration cycle can be surely calculated in the second vibration cycle. Although the first generating interval (the first pulse interval) at a predetermined position which is a beginning, etc., of the first vibration cycle (the first real cycle), the second generating interval (the second pulse interval) at a predetermined position which is a beginning, etc., of the second vibration cycle (the second real cycle) which is set corresponding to the predetermined position of the first vibration cycle, and the length of the first vibration cycle (the first real cycle) are used for calculation of the length of the second vibration cycle, the first generating interval and the first calculation cycle at the predetermined position (beginning, etc.) of the first real cycle are obtained based on the data read at the first real cycle, and the second generating interval at the predetermined position (beginning, etc.) of the second real cycle is obtained at the predetermined position (beginning, etc.) of the second real cycle. For this reason, because second calculation cycle can be calculated based on the data obtained by the predetermined position (beginning, etc.) of the second real cycle at the latest, the length of the second vibration cycle (the second calculation cycle) can be surely calculated in the second real cycle. Conversely, back-calculating a time necessary for calculating the length of the second vibration cycle (the second calculation cycle), etc., the predetermined position may be set not only at the beginning but also at a middle and an end of the second real cycle as long as the length of the second vibration cycle (the second calculation cycle), etc. can be calculated in the second real cycle, and a predetermined position set for the first real cycle is set at the beginning, middle, or end corresponding to the above.

BRIEF DESCRIPTION OF THE DRAWINGS

FIG. 4A is a timing diagram of a TDC pulse, FIG. 4B is a timing diagram of a CRK pulse, and FIG. 4C is a timing diagram of a driving current;

FIG. 6 is a flowchart of a method for controlling an active vibration isolating support apparatus in accordance with a second embodiment of the present invention;

FIG. 7A is a timing diagram of a TDC pulse, FIG. 7B is a timing diagram of a CRK pulse, and FIG. 7C is a timing diagram of a driving current; and FIG. 8A is a graph showing a target current corresponding to a first calculation cycle T11, FIG. 8B is a graph showing a target current corresponding to a third calculation cycle T13, and FIG. 8C is a graph showing a driving current corresponding to a third real cycle T03.

DETAILED DESCRIPTION OF THE PREFERRED EMBODIMENT

Next, referring to FIGS. 1-8, first and second embodiments of the present invention will be explained in detail. In addition, same reference numbers are used to denote the same components in FIGS. 1-8, and their repeated explanations are omitted.

First Embodiment

Figure 1:
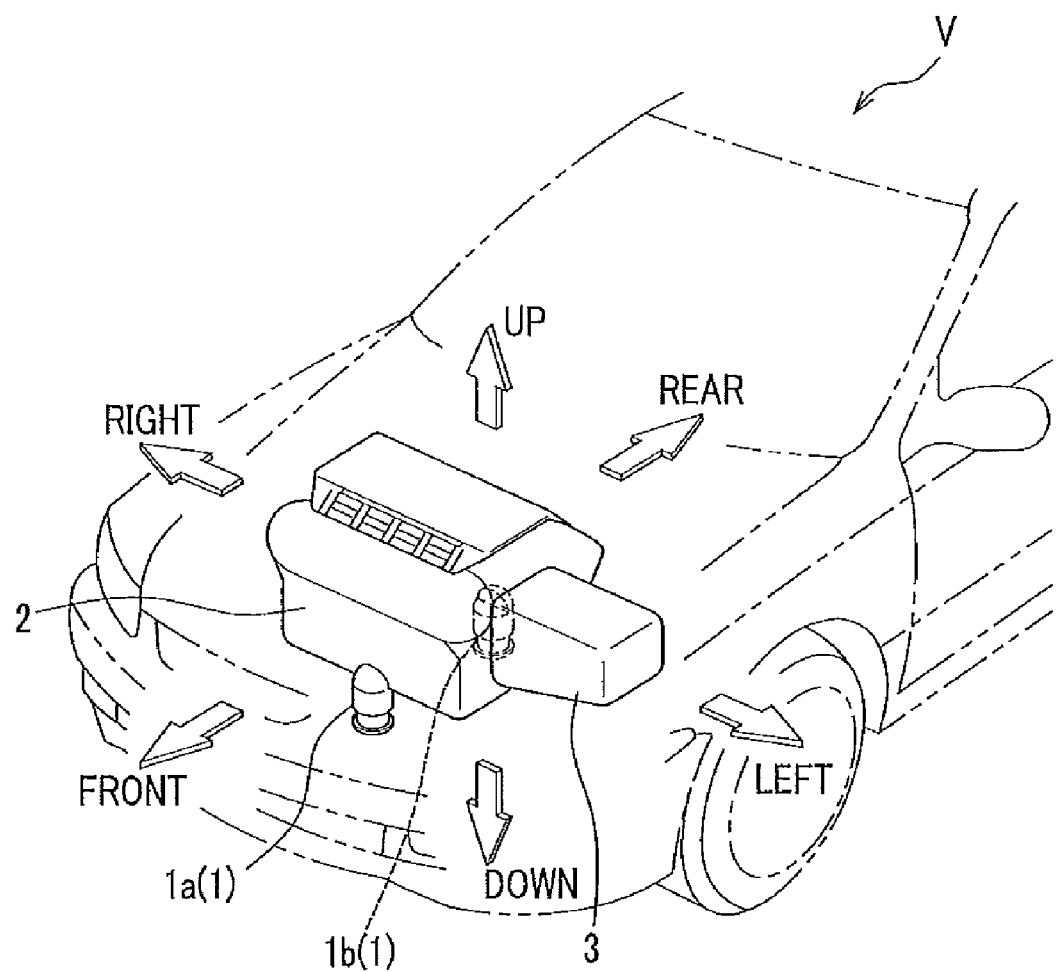
FIG. 1 is a perspective view of a vehicle provided with active vibration isolating support apparatuses in accordance with a first embodiment of the present invention.

As shown in FIG. 1, a V-type six-cylinder engine 2 is mounted at a front portion of a vehicle V. To the engine 2, a transmission 3 is connected. A direction in which the transmission 3 is connected to the engine 2 is an axial direction of a crankshaft (not shown). Therefore, the engine 2 is so-called side-ways mounted in the vehicle V so that the axial direction of the crankshaft (not shown) coincides with a direction transverse to a body of the vehicle V.

Two active vibration isolating support apparatuses 1 are disposed at front and rear portions under the engine 2 along the front-rear direction. Because the vibration of the engine 2 is generated associated with the revolution of the crankshaft, a direction of an amplitude of the vibration coincides with a direction of a plane surface whose normal is a revolution axis of the crankshaft (i.e., a front-rear and up-down direction in FIG. 1). A pair of the active vibration isolating support apparatuses 1 are disposed at a front end and a rear end of the engine 2 along the front-rear direction so that such a force caused by the vibration acts on the direction of the plane surface. One active vibration isolating support apparatus 1*a* is disposed at the front end under the engine 2, and the other active vibration isolating support apparatus 1*b* is disposed at the rear end under the engine 2.

Figure 2:
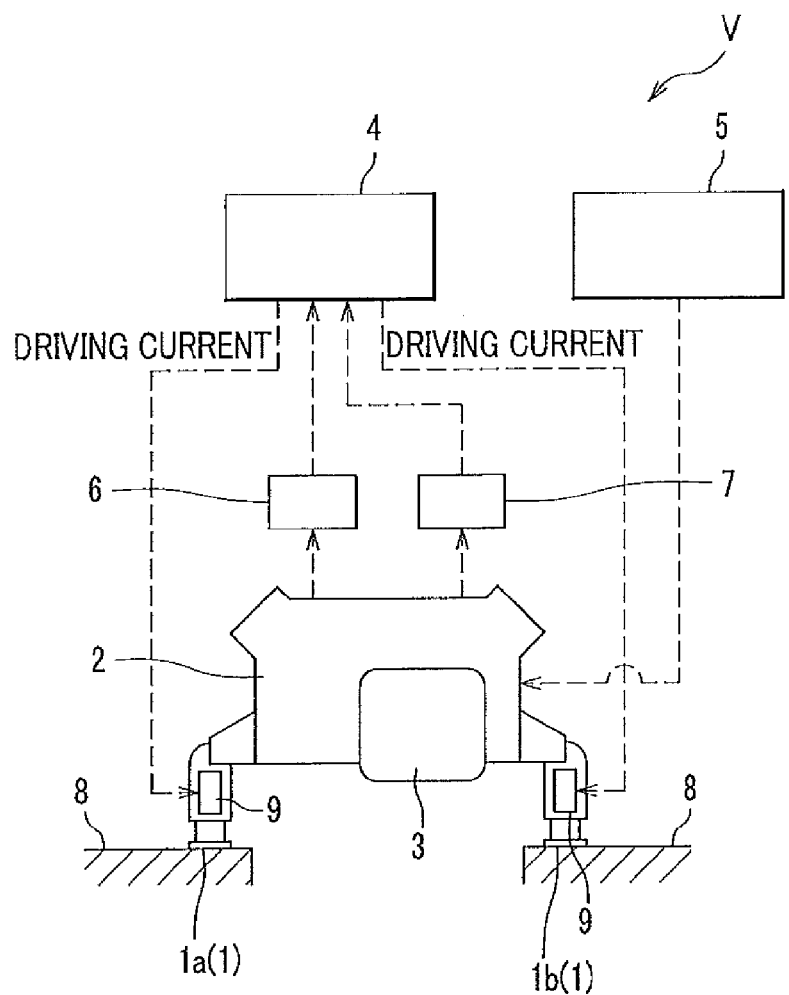
FIG. 2 is a block diagram of the vehicle provided with the active vibration isolating support apparatuses in accordance with the first embodiment of the present invention.

FIG. 2 is a block diagram of a vehicle V provided with the active vibration isolating support apparatuses 1 (1*a*, 1*b*) in accordance with a first embodiment of the present invention. Also, the active vibration isolating support apparatuses 1 (1*a*, 1*b*) are provided with a control unit 4. Two active vibration isolating support apparatuses 1 (1*a*, 1*b*) elastically support the engine 2 to a vehicle body frame 8. Each of the two active vibration isolating support apparatuses 1 (1*a*, 1*b*) has an actuator 9, and a driving current output from the control unit 4 drives the actuator 9 to extend and contract, thereby driving the active vibration isolating support apparatuses 1 (1*a*, 1*b*) to extend and contract. When the engine vibrates, a space between the engine 2 and the vehicle body frame 8 changes. The active vibration isolating support apparatuses 1 (1*a*, 1*b*) are driven to extend and contract to this amount of change, and the active vibration isolating support apparatuses 1 (1*a*, 1*b*) can suppress propagation of the vibration from the engine 2 to the vehicle body frame 8.

A engine control unit 5 controls the engine 2 to start and stop the revolution, and to increase and decrease the revolution speed.

The engine 2 generates a crank pulse associated with the revolution of the engine 2 (i.e., the revolution of the crankshaft). A crank pulse sensor 7 detects the crank pulse, and send it to the control unit 4. The crank pulse is output per a predetermined crank angle. For example, the crank pulse sensor 7 detects the crank pulse 60 times per revolution of the crankshaft, that is, once every 6 degrees of crank angle.

The engine 2 revolves the crankshaft by vertical motion of pistons in a plurality of cylinders (e.g., six-cylinder). Also, the engine 2 is provided with TDC pulse sensors 6 for every cylinder so as to detect a Top Dead Center (TDC) when the piston moves up. The TDC pulse sensor 6 detects the TDC pulse which is generated when the piston arrives at the TDC in every cylinder. If the engine 2 is six-cylinder, the TDC pulse sensor 6 detects the TDC pulse 6 times per 2 revolutions of the crankshaft, that is, once every 120 degrees of crank angle. The TDC pulse sensor 6 detects the TDC pulse, and sends it to the control unit 4.

If the crank pulse is output once every 6 degrees of crank angle and the TDC pulse is output once every 120 degrees of crank angle, the crank pulses are output and detected 20 times per TDC pulse, that is, between the TDC pulses constantly.

Figure 3:
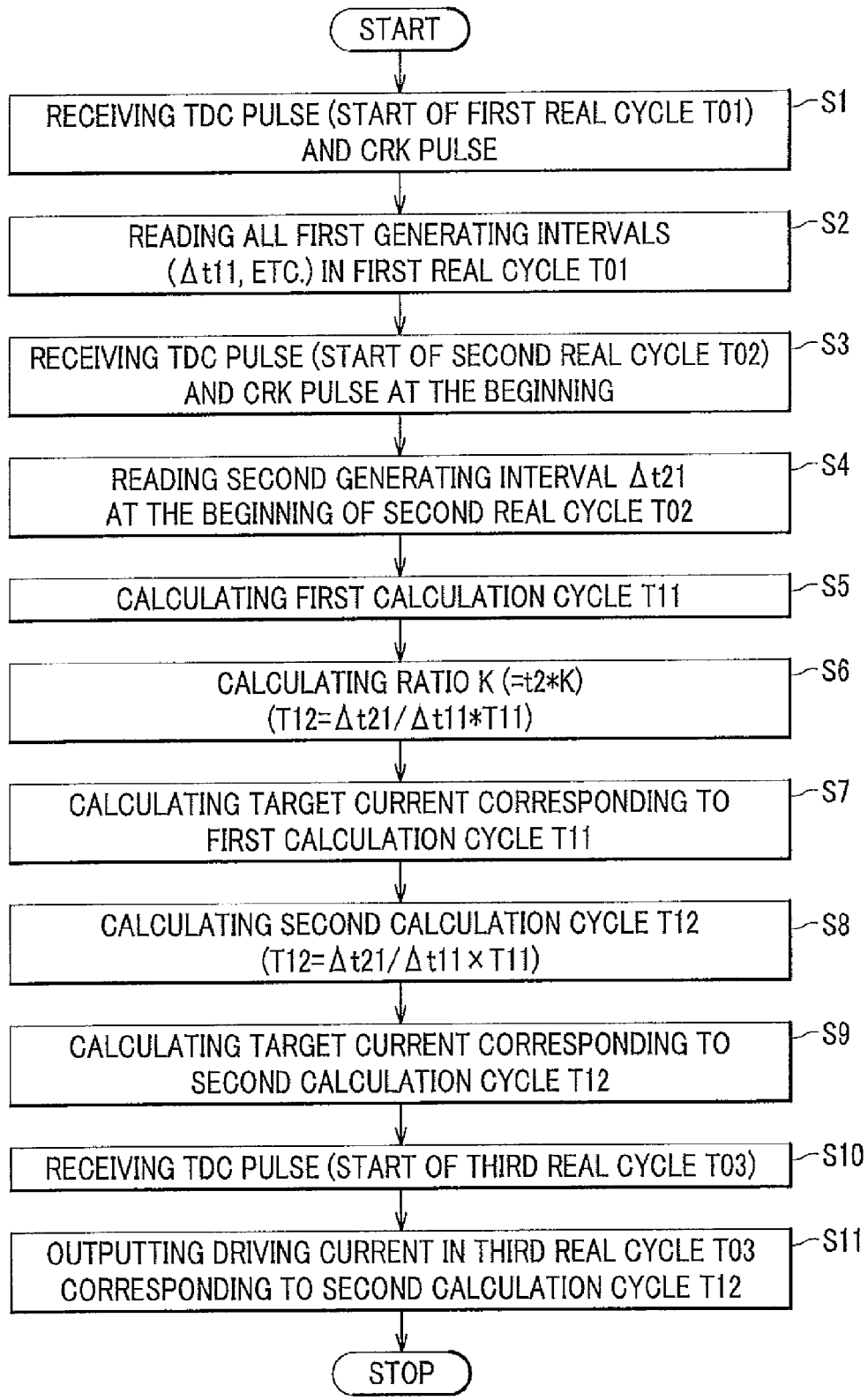
FIG. 3 is a flowchart of a method for controlling the active vibration isolating support apparatus in accordance with the first embodiment of the present invention.

FIG. 3 is a flowchart of a method for controlling the active vibration isolating support apparatus 1 in accordance with the first embodiment of the present invention using the control unit 4.

First, in step S1, the control unit 4 receives the TDC pulse which is output per vibration cycle of the engine 2, and the crank (CRK) pulse which is output per predetermined crank angle (6 degrees). As shown in FIGS. 4A and 4B, although the TDC pulse is received 4 times, the number of the CRK pulses which are received between the TDC pulses are 20 times, that is constant. Because receiving intervals of the TDC pulse and the CRK pulse become narrower as time t elapses, it is found that the revolution speed of the engine 2 is increasing.

Because the vibration of the engine 2 is caused by vertical motion of piston in every cylinder mainly, the vibration of the engine 2 is synchronized with the TDC pulse which is synchronized with the vertical motion of the piston. For this reason, the vibration cycle of the engine 2 is a generating or receiving interval of the TDC pulse. A first real cycle T01 of the vibration of the engine 2 is started at the time of receiving the first TDC pulse, and is ended by receiving a second TDC pulse. Likewise, a second real cycle T02 of the vibration of the engine 2 is started at the same time, the first real cycle T01 is ended, and the second real cycle T02 is ended by receiving a third TDC pulse. Likewise, a third real cycle T03 of the vibration of the engine 2 is started at the same time, the second real cycle T02 is ended, and the third real cycle T03 is ended by receiving a fourth TDC pulse.

In step S2, the control unit 4 sequentially reads and stores first generating intervals $\Delta t11, \Delta t12, \ldots, \Delta t1n$ which are CRK pulse intervals between all of the CRK pulses over the first real cycle T01 of the vibration of the engine.

In step S3, the control unit 4 receives the TDC pulse which is the start of the second real cycle T02 of the vibration of the engine, and the crank pulse which is output at the beginning (corresponding to the predetermined position) of the second real cycle T02.

In step S4, the control unit 4 reads and stores the second generating interval $\Delta t21$ which is a CRK pulse interval between CRK pulses at the beginning (corresponding to the predetermined position) of the second real cycle T02 of the vibration of the engine. In addition, the second generating interval is not limited to the second generating interval $\Delta t21$, for example, may be a second generating interval $\Delta t22$ next to the second generating interval $\Delta t21$, and may be a sum of a plurality of second generating intervals ($\Delta t21+\Delta t22$). In this case, in step S6, the first generating interval $\Delta t11$ at the beginning (corresponding to the predetermined position) in the first calculation cycle T11 is changed corresponding to the second generating interval which is the CRK pulse interval between CRK pulses at the beginning (corresponding to the predetermined position) in the second real cycle T02. For example, the first generating interval $\Delta t12$ at the beginning in the first calculation cycle T11 is corresponded to the second generating interval $\Delta t22$ which is the CRK pulse interval between CRK pulses at the beginning in the second real cycle T02, and a ratio K is calculated by $K=T11/\Delta t12$. A sum ($\Delta t11$ $\Delta t12$) of the first generating interval at the beginning in the first calculation cycle T11 is corresponded to a sum ($\Delta t21+\Delta t22$) of the second generating interval which is the CRK pulse interval between CRK pulses at the beginning in the second real cycle T02, and the ratio K is obtained by $K=T11/(\Delta t11+\Delta t12)$.

In step S5, the control unit 4 calculates the first calculation cycle T11 as a sum of accumulated all of the first generating intervals $\Delta t11, \Delta t12, \ldots, \Delta t1n$ over the first real cycle T01. The first calculation cycle T11 corresponds to a calculated value of the first real cycle T01. Also, by calculating the first calculation cycle T11, it is possible to grasp the first calculation cycle T11 as a time-axis O1 whose origin is the start of the first real cycle T01, and calculation is performed for the time on the time-axis O1 in steps S6 and S7. In addition, steps S5 and S4 may be performed at the same time.

In step S6, the control unit 4 calculates the ratio K ($=T11/\Delta t11$) between the first calculation cycle T11 and the first generating interval $\Delta t11$ at the beginning (corresponding to the predetermined position) in the first calculation cycle T11. In addition, steps S6 and step S4 may be performed at the same time. For example, assume that the number of the CRK pulse received between TDC pulses is 20. If the engine 2 revolves at a constant speed, the ratio K is equal to 20 (K=20), if the engine 2 accelerates, the ratio K is less than 20 (K<20), and if the engine 2 decelerates, the ratio K is greater than 20 (K>20).

In step S7, the control unit 4 calculates an estimated vibration of the engine 2 corresponding to the first calculation cycle T11, and a target current from the estimated vibration. Concretely, first, the control unit 4 divides the predetermined crank angle (6 degrees) by the first generating intervals Δt11, Δt12, . . . , Δt1n for every first generating intervals Δt11, Δt12, . . . , Δt1n so as to calculate crank angular velocities ω. Next, the control unit 4 differentiates the crank angular velocities ω with respect to time for every first generating intervals Δt11, A t12, . . . , Δt1n so as to calculate crank angular accelerations dω/dt. Next, the control unit 4 calculates torques Tq for every first generating intervals Δt11, A t12, . . . , Δt1n by Tq=I*dω/dt where I is a moment of inertia around the crankshaft of the engine 2. If the crankshaft revolves at a constant angular velocity ω, the torque Tq becomes 0 (zero). However, the angular velocity ω is increased by acceleration of the piston in an expansion process, the angular velocity ω is decreased by deceleration of the piston in the compression process, and the crank angular acceleration dω/dt is generated by increasing/decreasing the revolution speed of the engine 2. Therefore, the torque Tq which is proportional to a crank angular acceleration dω/dt composed of the above is generated.

Next, the control unit 4 calculates amplitudes of the vibration of the engine 2 for every first generating intervals Δt11, Δt12, . . . , Δt1n based on the torque Tq. Next, the control unit 4 calculates lengths for which the active vibration isolating support apparatus 1 extends and contracts for every first generating intervals Δt11, Δt12, . . . , Δt1n based on the amplitudes of the vibration of the engine 2. Next, the control unit 4 calculates and determines (a duty waveform of) a target current supplied to the actuator 9 of the active vibration isolating support apparatus 1 so as to realize the above lengths for every first generating intervals Δt11, Δt12, . . . , Δt1n as shown by a solid line in FIG. 5A. The target current shown by the solid line in FIG. 5A is thought to be calculated for the time-axis O1 of the first calculation cycle T11, where the cycle is defined by the first calculation cycle T11.

In step S8, the control unit 4 calculates the second calculation cycle T12 (=Δt21*K) from the second generating interval Δt21 at the beginning (corresponding to the predetermined position) in the second real cycle T02 and the ratio K. The second calculation cycle T12 corresponds to a calculated value in the second real cycle T02. Also, by calculating the second calculation cycle T12, it is possible to grasp the second calculation cycle T12 as a time-axis O2 whose origin is the start of the second real cycle T02. In addition, although the second calculation cycle T12 is calculated using the ratio K, it can be substantially calculated by T12=Δt21/Δt11*T11. Because it is thought that the ratio between the first generating interval Δt11 at the beginning (corresponding to the predetermined position) in the first real cycle T01 and the second generating interval Δt21 at the beginning (corresponding to the predetermined position) in the second real cycle T02 is approximately equal to the ratio between the first calculation cycle T11 and the second calculation cycle T12. Also, the second calculation cycle T12 may be calculated using T12=Δt21/Δt11*T11 in step S8 without calculating the ratio K in step S6.

Figure 5A:
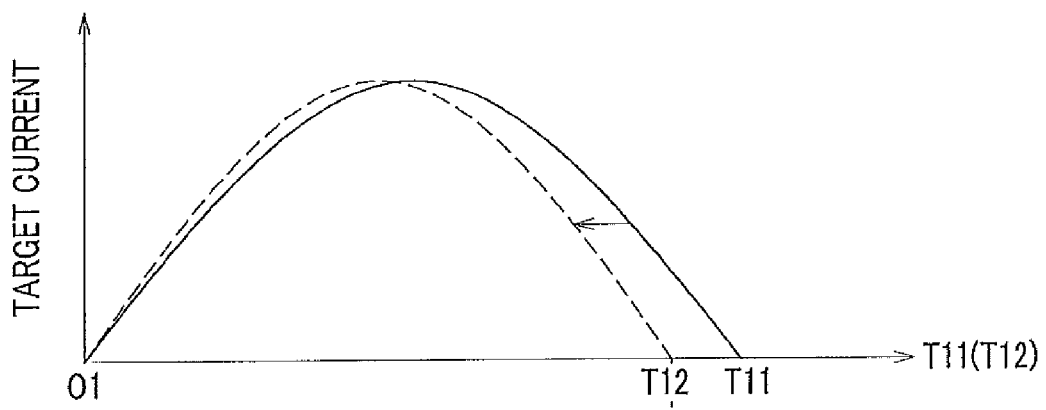
FIG. 5A a graph showing a target current corresponding to a first calculation cycle T11.
Figure 5B:
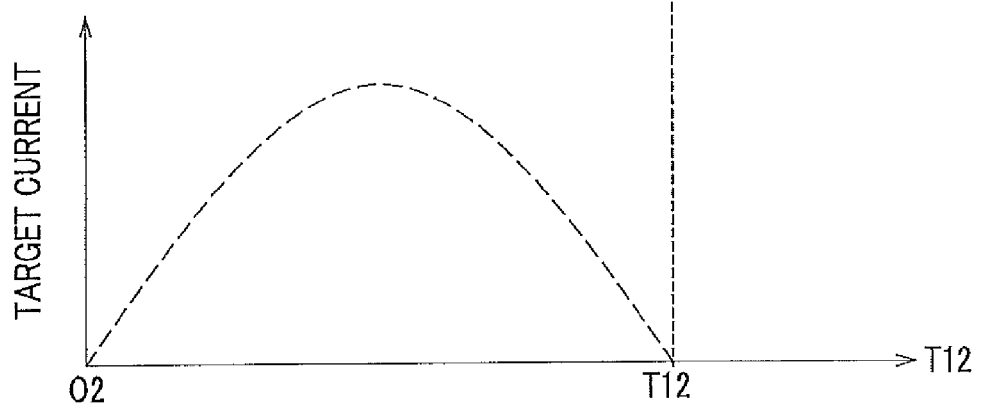
FIG. 5B is a graph showing a target current corresponding to a second calculation cycle T12.

In step S9, the control unit 4 calculates a target current corresponding to the second calculation cycle T12 shown by a dotted line in FIG. 5A from the target current (shown by the solid line in FIG. 5A) corresponding to the first calculation cycle T11, and the second calculation cycle T12. The target current shown by the dotted line in FIG. 5A, that is, a target current shown in FIG. 5B is thought to be calculated for the time-axis O2 of the second calculation cycle T12, where the cycle is defined by the second calculation cycle T12. Also, it can be thought that the target current which is normalized so as to correspond to the first calculation cycle T11 is re-normalized so as to correspond to the second calculation cycle T12.

In step S10, the control unit 4 receives a TDC pulse which is a start of the third real cycle T03 of the vibration of the engine.

Figure 5C:
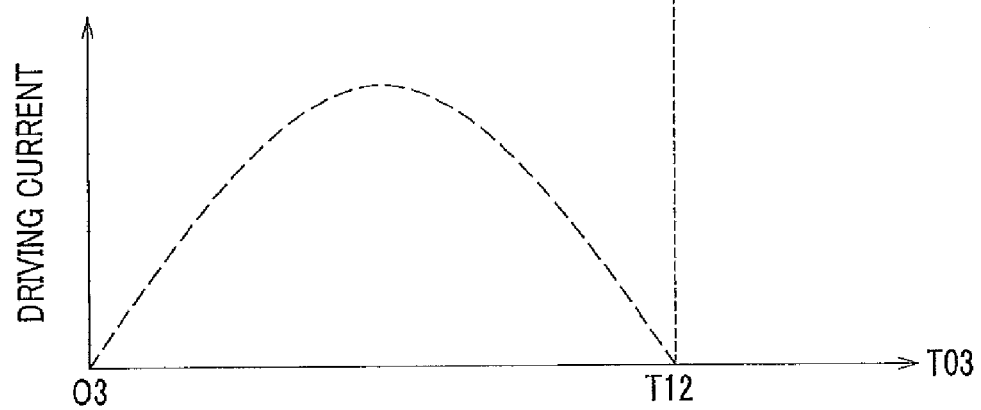
FIG. 5C is a graph showing a driving current corresponding to a third real cycle T03.

In step S11, as shown in FIGS. 4C and 5C, the control unit 4 outputs a driving current so as to coincide with a (normalized) target current corresponding to the second calculation cycle T12 in the third real cycle T03 and subsequent cycle of the vibration of the engine next to the second real cycle T02. That is, the driving current is normalized corresponding to the second calculation cycle T12. Because a driving current for the second real cycle T02 (the second calculation cycle T12) whose value is not separate from that for the first real cycle T01 (the first calculation cycle T11) is supplied for the third real cycle T03, deviation in cycle becomes small, the propagation of the vibration of the engine can be suppressed enough, and the occupant may feel less sense of discomfort.

Second Embodiment

In a second embodiment, the active vibration isolating support apparatus 1 of the first embodiment shown in FIGS. 1 and 2 can be used. FIG. 6 is a flowchart of a method for controlling the active vibration isolating support apparatus 1 in accordance with the second embodiment of the present invention using the control unit 4 (see FIG. 2) of the active vibration isolating support apparatus 1 of the first embodiment.

First, steps S1-S8 can be performed like the first embodiment.

In step S12, the control unit 4 calculates a cycle change rate R (=T12/T11) which is a ratio between the second calculation cycle T12 and the first calculation cycle T11. In addition, the cycle change rate R may be calculated using R=Δt21/Δt11. In this case, step S12 is performed before step S8, and the second calculation cycle T12 can be calculated using T12=R*T11 in step S8.

In step S13, the control unit 4 calculates a third calculation cycle T13 (=R*T13) from the cycle change rate R and the second calculation cycle T12. The third calculation cycle T13 corresponds to a calculated value (measured value) of the third real cycle T03. Also, as shown in FIG. 7, by calculating the third calculation cycle T13, is possible to grasp the third calculation cycle T13 as a time-axis O3 whose origin is the start of the third real cycle T03. In addition, although the third calculation cycle T13 is calculated using the second calculation cycle T12, it can be substantially calculated by T13= (Δt21/Δt11)²*T11=R²*T11. Because it is thought that the ratio between the first generating interval Δt11 at the beginning (corresponding to the predetermined position) in the first real cycle T01 and the second generating interval Δt21 at the beginning (corresponding to the predetermined position) in the second real cycle T02 is approximately equal to the ratio between the first calculation cycle T11 and the second calculation cycle T12. Also, because it is thought that the ratio between the first calculation cycle T11 and the second calculation cycle T12 is approximately equal to the ratio between the second calculation cycle T12 and the third calculation cycle T13. Also, the third calculation cycle T13 may be calculated using $T13=(\Delta t21/\Delta t11)^2*T11$ in step S10 without calculating the second calculation cycle T12 in steps S6 and S8. Equation $T13=(\Delta t21/\Delta t11)^2*T11$ is obtained by substituting the above equations. Because the second calculation cycle T12, etc. are removed from this equation, it seems that the second calculation cycle T12 is not calculated. However, the second calculation cycle T12 may be calculated indirectly in a calculating process using this equation, and it is self-evident that a product does not change if the sequence of multiplication is changed. Therefore, if the second calculation cycle T12 is not calculated in the calculating process, the result is substantially equivalent to that where the second calculation cycle T12 is calculated in the calculating process.

In step S14, the control unit 4 calculates a target current corresponding to the third calculation cycle T13 shown by a dotted line in FIG. 8A from the target current (shown by the solid line in FIG. 8A) corresponding to the first calculation cycle T11, and the third calculation cycle T13. The target current shown by the dotted line in FIG. 8A, that is, a target current shown in FIG. 8B is thought to be calculated for the time-axis O3 of the third calculation cycle T13, where the cycle is defined by the third calculation cycle T13. Also, it can be thought that the target current which is normalized so as to correspond to the first calculation cycle T11 is re-normalized so as to correspond to the third calculation cycle T13.

In step S15, the control unit 4 receives a TDC pulse which is a start of the third real cycle T03 of the vibration of the engine.

In step S16, as shown in FIGS. 7C and 8C, the control unit 4 outputs a driving current so as to coincide with a (normalized) target current corresponding to the third calculation cycle T13 in the third real cycle T03 and subsequent cycle of the vibration of the engine next to the third real cycle T02. That is, the driving current is normalized corresponding to the third calculation cycle T13. Because a driving current which is normalized by the third calculation cycle T13 which approximately coincides with the third real cycle T03, deviation in cycle becomes small, the propagation of the vibration of the engine can be suppressed enough, and the occupant may feel less sense of discomfort.

What is claimed is:

1. An active vibration isolating support apparatus, comprising:
    a control unit to measure a crank pulse based on revolution of an engine, to calculate a target current value supplied to an actuator for isolating vibration in a next second vibration cycle using data of the crank pulse which belongs to a first vibration cycle of vibration cycles of the engine, and to control the actuator using the calculated target current value in a next third vibration cycle,
    wherein the control unit
        calculates a length of the first vibration cycle,
        defines a crank pulse interval of the crank pulse which belongs to the first vibration cycle at a predetermined position of the first vibration cycle as a first pulse interval,
        defines a crank pulse interval of the crank pulse which belongs to the second vibration cycle at a predetermined position of the second vibration cycle which is set corresponding to the predetermined position of the first vibration cycle as a second pulse interval,
        calculates a length of the second vibration cycle using the first pulse interval, the second pulse interval, and the length of the first vibration cycle, and
        calculates the target current value supplied to the actuator in the third vibration cycle, in the second vibration cycle.

2. The active vibration isolating support apparatus of claim 1, wherein the control unit calculates the target current value supplied to the actuator in the third vibration cycle using the length of the second vibration cycle.

3. The active vibration isolating support apparatus of claim 1, wherein the control unit calculates a length of the third vibration cycle using the length of the first vibration cycle, and the length of the second vibration cycle, and calculates the target current value supplied to the actuator using the length of the third vibration cycle.

4. A method for controlling an active vibration isolating support apparatus, the active vibration isolating support apparatus comprising:
    a control unit to measure a crank pulse based on revolution of an engine, to calculate a target current value supplied to an actuator for isolating vibration in a next second vibration cycle using data of the crank pulse which belongs to a first vibration cycle of vibration cycles of the engine, and to control the actuator using the calculated target current value in a next third vibration cycle,
    wherein the control unit
        calculates a length of the first vibration cycle,
        defines a crank pulse interval of the crank pulse which belongs to the first vibration cycle at a predetermined position of the first vibration cycle as a first pulse interval,
        defines a crank pulse interval of the crank pulse which belongs to the second vibration cycle at a predetermined position of the second vibration cycle which is set corresponding to the predetermined position of the first vibration cycle as a second pulse interval,
        calculates a length of the second vibration cycle using the first pulse interval, the second pulse interval, and the length of the first vibration cycle, and
        calculates the target current value supplied to the actuator in the third vibration cycle, in the second vibration cycle.

5. The method of claim 4, wherein the control unit calculates the target current value supplied to the actuator in the third vibration cycle using the length of the second vibration cycle.

6. The method of claim 4, wherein the control unit calculates a length of the third vibration cycle using the length of the first vibration cycle, and the length of the second vibration cycle, and calculates the target current value supplied to the actuator using the length of the third vibration cycle.

* * * * *